United States Patent [19]
Bates et al.

[11] Patent Number: 5,768,228
[45] Date of Patent: Jun. 16, 1998

[54] METHOD AND SYTEM FOR CANCELLING OPTICAL SERVO CROSSTALK IN OPTICAL DISK DRIVES

[75] Inventors: Allen Keith Bates; Alan August Fennema, both of Tucson, Ariz.; Tetsuo Semba, Zama, Japan

[73] Assignee: International Business Machines Corporation, Armonk, N.Y.

[21] Appl. No.: 711,001

[22] Filed: Sep. 9, 1996

[51] Int. Cl.⁶ .................................................. G11B 7/085
[52] U.S. Cl. .................... 369/44.28; 369/44.29
[58] Field of Search .......................... 369/44.25–44.27, 369/44.28, 44.29, 44.32, 44.34, 44.35–44.36, 54, 58

[56] References Cited

U.S. PATENT DOCUMENTS

| | | | |
|---|---|---|---|
| 4,118,736 | 10/1978 | Okada et al. | |
| 4,300,226 | 11/1981 | Barnette et al. | |
| 4,310,912 | 1/1982 | Kikuchi et al. | 369/43 |
| 4,665,442 | 5/1987 | Kanamaru | |
| 4,815,059 | 3/1989 | Nakayama et al. | |
| 5,004,901 | 4/1991 | Toshimoto et al. | 369/44.29 X |
| 5,027,336 | 6/1991 | Sugiura | 369/44.13 |
| 5,166,914 | 11/1992 | Shimada et al. | 369/32 |
| 5,199,011 | 3/1993 | McDonald et al. | 369/58 |
| 5,231,621 | 7/1993 | Matsui et al. | 369/44.32 |
| 5,367,513 | 11/1994 | Bates et al. | 369/44.29 |
| 5,396,478 | 3/1995 | Krantz | 369/44.41 |
| 5,414,681 | 5/1995 | Iida et al. | 369/44.25 |

FOREIGN PATENT DOCUMENTS

62-146439  6/1987  Japan .

OTHER PUBLICATIONS

Patent Abstracts of Japan, vol. 12, No. 497, P806, & JP 63-205830, Dec. 26, 1988.
Patent Abstracts of Japan, vol. 13, No. 85, P834, & JP 63-266640, Feb. 27, 1989.
Patent Abstracts of Japan, vol. 14, No. 219, P1045, & JP 2-50323, May 9, 1990.
Patent Abstracts of Japan, vol. 17, No. 255, P1539, & JP 4-372726, May 20, 1993.
"Optical Servo Crosstalk," Technical Digest Series, vol. 1, Optical Data Storage, Jan. 1989, Optical Society of America.

*Primary Examiner*—W. R. Young
*Attorney, Agent, or Firm*—Dan A. Shifrin; Antony P. Ng; Andrew J. Dillon

[57] ABSTRACT

A method for cancelling optical servo crosstalk within an optical disk drive is disclosed. In accordance with the method and system of the present invention, the optical disk drive system includes a focus control module, a tracking control module, a variable frequency notch filter, and a lookup table. The focus control module is utilized for moving an objective lens in response to a focus error signal in order to maintain a laser beam in an in-focus condition on an optical disk. The tracking control module is utilized for moving a moving optical element in response to a tracking error signal to direct the laser beam onto a desired track position of the optical disk. The lookup table within the focus control module is utilized for storing several sets of tap coefficients for the variable frequency notch filter. An appropriate set of tap coefficients from the lookup table is supplied to the variable frequency notch filter in response to a head velocity signal from the tracking control module such that the effects caused by a false FES in the optical disk drive system are reduced.

10 Claims, 4 Drawing Sheets

Pole at 1kHz, Sampling 64kHz

METHOD AND SYTEM FOR CANCELLING OPTICAL SERVO CROSSTALK IN OPTICAL DISK DRIVES

BACKGROUND OF THE INVENTION

1. Technical Field

The present invention relates to a method and system for data processing in general and, in particular, to a method and system for noise reduction in a data storage medium. Still more particularly, the present invention relates to a method and system for cancelling optical servo crosstalk in an optical disk drive.

2. Description of the Prior Art

Optical disk drives utilize a laser beam to record data onto and sense data from optical disks. The surface of these optical disks is manufactured with closely spaced tracks, either spiral or concentric. In order to maintain the laser beam in proper focus on the surface of the optical disks, a focus servo system is provided within the optical disk drive to move an objective lens as needed to maintain focus. Once the proper track has been found so that read and write operations can commence, a tracking servo system is utilized to maintain the position of the laser beam on the correct track.

An astigmatic method of focus error detection is commonly employed for focus control feedback within the focus servo system because of its simplicity, sensitivity, and low cost. The astigmatic method of focus error detection is principally based on a geometric projection of a far field intensity pattern on an optical detector to generate a focus error signal (FES). One disadvantage of the astigmatic method, however, is that a false FES may be produced when a focused laser spot from the objective lens scans across a track of an optical disk. This false FES is sometimes referred to as optical servo crosstalk, optical feedthrough, or patten noise. The false FES disturbance is especially prevalent when the focused laser spot from the objective lens crosses over a groove structure (track) on the optical disk during a seek operation.

During the seek operation, the track-crossing rate typically ranges from a few KHz to a few hundred KHz, and the focus servo system would respond to a false FES because the loop bandwidth of the focus servo system is also very close to a few KHz, at around the lower end of the above frequency range. The result is that the false FES can force the focus servo system into an unstable condition or cause a defocusing effect during the initial and final stage of the seek operation when the track-crossing rate is relatively low. Typically, a period counter along with a tracking error signal (TES) detector are utilized to count the distance to the target position and to detect the head velocity of a moving optical element during the seek operation. However, because the instability and defocusing effect can distort and degrade the tracking error signal, the ability for the focus servo system to perform its functions will be significantly impaired, which can lead to a reduction in seek reliability and an increase in access time.

There are several methods under prior art intended for minimizing the effects of false FES or optical servo crosstalk. One method is to switch the focus servo system to a low bandwidth mode during the entire seek operation so that it does not respond to the optical servo crosstalk. However, while operating in the low bandwidth mode, the focus servo system must also provide the same error rejection ratio at low frequencies in order to ensure proper servo operations (the low bandwidth mode is required for the entire seek period). This constrains the implementation method as to the usage of a higher-order filter function, and the result is that a higher performance Digital Signal Processor (DSP) must be utilized in order to realize the same sampling frequency.

Another method for minimizing the effects of optical servo crosstalk is to synchronize the sampling between FES and TES. This method requires the sampling of FES at the time when it is least sensitive to optical servo crosstalk. One disadvantage of this method is that it is very difficult to maintain the same error rejection ratio because the loop bandwidth of the focus servo system is approximately ten times smaller than the typical sampling frequency. Thus, if the sampling frequency is 10 KHz, the focus servo loop bandwidth will be about 1 KHz which is not suitable for a high RPM drive. Another disadvantage of this method is that an additional circuit is necessary to detect the time when the FES is least sensitive to optical servo crosstalk.

Consequently, it would be desirable to provide an improved method and system for cancelling optical servo crosstalk produced by the astigmatic method of focus error detection during a seek operation within an optical disk drive.

SUMMARY OF THE INVENTION

In view of the foregoing, it is therefore an object of the present invention to provide an improved method and system for data processing.

It is another object of the present invention to provide an improved method and system for noise reduction in a data storage medium.

It is yet another object of the present invention to provide an improved method and system for optical servo crosstalk cancellation in an optical disk drive.

In accordance with the method and system of the present invention, an optical disk drive system includes a focus control module, a tracking control module, a variable frequency notch filter, and a lookup table. The focus control module is utilized to move an objective lens in response to a focus error signal in order to maintain a laser beam in an in-focus condition on an optical disk. The tracking control module is utilized to move a moving optical element in response to a tracking error signal to direct the laser beam onto a desired track position of the optical disk. The lookup table within the focus control module is utilized to store several sets of tap coefficients for the variable frequency notch filter. An appropriate set of tap coefficients from the lookup table is supplied to the variable frequency notch filter in response to a head velocity signal from the tracking control module such that the effects caused by a false FES in the optical disk drive system are reduced.

All objects, features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention is described with respect to an embodiment for an optical disk drive system; however, those skilled in the art will appreciate that the present invention may also be applicable to a magneto-optical system or other types of information storage and retrieval systems and that the scope of the present invention extends to such embodiments.

Figure 1:
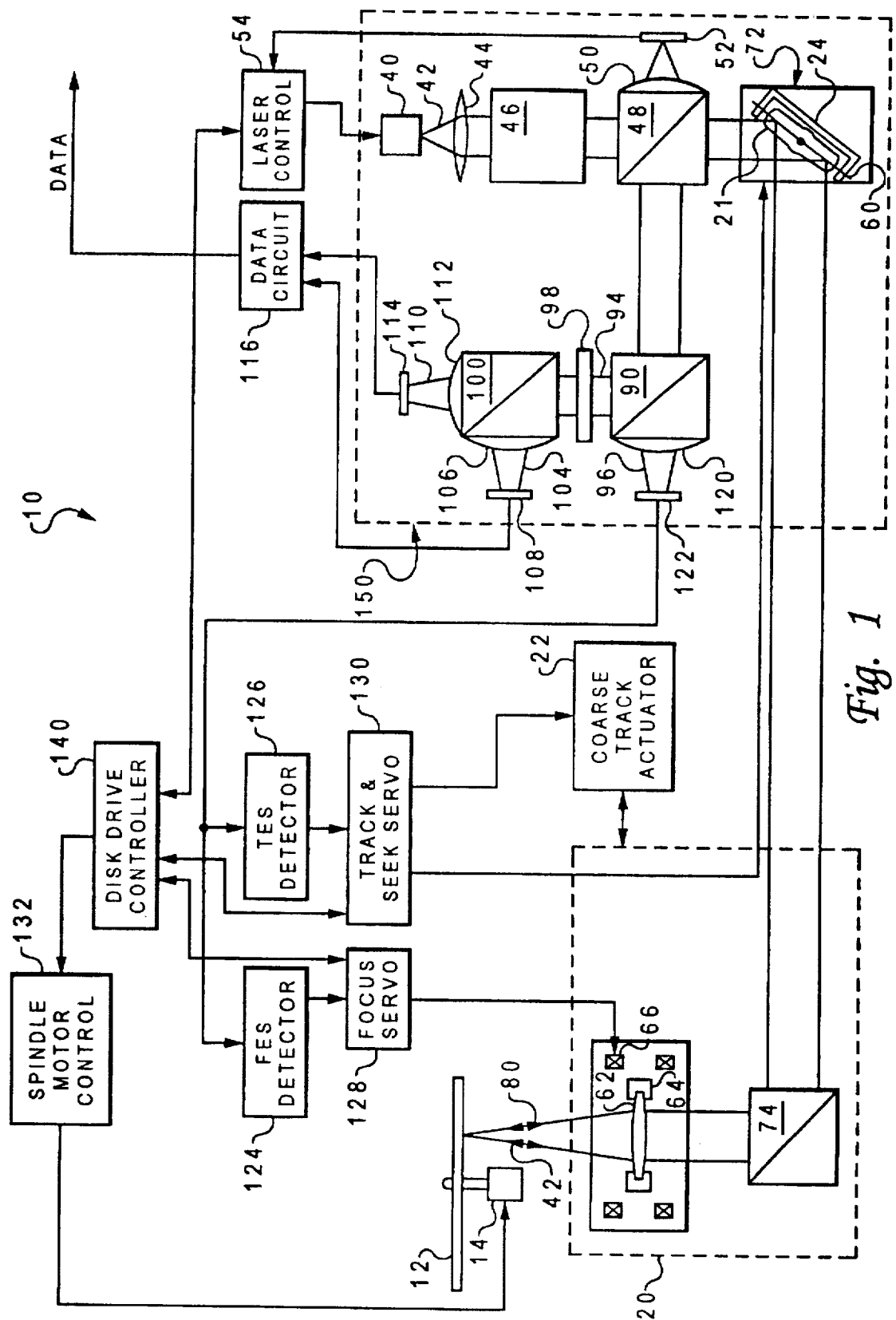
FIG. 1 is a block diagram of a preferred embodiment of an optical disk drive system in which the present invention may be incorporated.

Referring now to the drawings and in particular to FIG. 1, there is depicted a block diagram of a preferred embodiment of an optical disk drive system 10 in which the present invention may be incorporated. Optical disk drive system 10 has computer-generated data stored in a disk 12. Disk 12, typically having concentric or spiral data tracks, is mounted to a spindle motor 14. A moving optical element (MOE) 20 is positioned directly below disk 12 and is moved in a radial direction relative to disk 12 by a course track actuator 22.

A fixed optical element (FOE) system 150 comprises a laser 40, a lens 44, a circularizer (or prism) 46, a beam splitter 48, a lens 50, a detector 52, a beam splitter 90, a waveplate 98, a beam splitter 100, lenses 106, 112, 120 along with detectors 108, 114, 122 and fine track actuator 72. Laser 40, which may be a laser diode, produces a polarized light beam 42. Light beam 42 is collimated by lens 44 and circularized by circularizer 46. Light beam 42 then passes to beam splitter 48, and a portion of light beam 42 is reflected towards lens 50, which focuses a light to a power monitor optical detector 52. Detector 52 is connected to a laser control 54 for providing a monitor power signal, which is utilized to adjust the power of laser 40 as appropriate.

The remaining portion of light beam 42 passes through beam splitter 48 to a mirror 60 mounted to a fine track actuator 72, which includes a rotor 21 and a rotor mount 24. Fine track actuator 72 rotates mirror 60 in small distances, which, in turn, moves light beam 42 in a radial direction on the surface of disk 12 via a beam bender 74 for purposes of maintaining light beam 42 on the proper track position on disk 12. Beam bender 74 reflects the light toward an objective lens 62 mounted in a lens holder 64, which may be held laterally to disk 12 by focus actuator 66 in order to focus light beam 42 on the proper track position on disk 12. A light beam 80 is reflected from the disk 12, passing through objective lens 62 and returning to mirror 60 via beam bender 74. A portion of the light beam 80 is then reflected by beam splitter 48 to beam splitter 90. Beam splitter 90 then divides light beam 80 into a data beam 94 and a servo beam 96.

Servo beam 96 may be focussed by lens 120 onto a segmented optical detector 122, such as a spot size measuring detector as is known in the art. A focus error signal (FES) detector circuit 124 and a tracking error signal (TES) detector circuit 126 are connected to optical detector 122. A focus servo 128 is connected between FES detector circuit 124 and focus actuator 66 to receive a FES from FES detector circuit 124 for causing focus actuator 66 to adjust the position of objective lens 62 as appropriate in order to maintain proper focus. A track & seek servo 130 is connected between TES detector circuit 126 and track actuators 22, 72. Track & seek servo 130 receives a TES from TES detector circuit 126 for causing coarse track actuator 22 to adjust the position of MOE 20 as appropriate to seek desired tracks on disk 12, and causing fine track actuator 72 to rotate mirror 60 as appropriate to maintain proper tracking position once the appropriate track is reached. A disk drive controller 140 provides overall control for focus servo 128 and track & seek servo 130, as well as laser control 54 and spindle motor control 132. Spindle motor control 132 is connected to spindle motor 14.

Data beam 94 passes through a half waveplate 98 to a polarizing beam splitter 100, which divides data beam 94 into two orthogonal polarization component beams. A first polarization component beam 104 is focussed by lens 106 to a data optical detector 108. A second polarization component beam 110 is focussed by lens 112 to a data optical detector 114. Data circuit 116, connecting to data optical detectors 108 and 114, generates a data signal responsive to the differences in the amount of light detected at data optical detectors 108 and 114, which is representative of the data recorded on disk 12, and converts the analog input signal into a digital waveform representation output by utilizing any useful manner known in the art.

During a read operation, disk drive controller 140 causes laser control 54 to energize laser 40 to generate a low-power polarized beam 42 which is not powerful enough to heat disk 12 above its Curie temperature. Phase changes in the reflected light are detected by data optical detectors 108, 114 and passed to data circuit 116 that outputs a digitized data signal representative of the recorded data. During a write operation, disk drive controller 140 causes laser control 54 to energize laser 40 to provide a high-power polarized beam 42 that is powerful enough to form marks or pits on disk 12. Laser 40 is pulsed responsive to the data to be recorded on disk 12, resulting in marks and spaces on the surface of disk 12.

In a preferred embodiment, optical disk drive 10 is a multi-mode drive that can write data to an optical disk 12 in any one of several write encoding methods. The desired write-encoding method and laser power levels are selected and controlled by disk drive controller 140, usually as a function of the type of data storage medium and data density. Typically, data stored on an optical disk is encoded utilizing either Pulse-Position Modulation (PPM) or Pulse-Width Modulation (PWM). PPM data recording comprises a well-known encoding method in which the presence of a peak in a data waveform is interpreted as a selected one of a binary 1 or binary 0. In general, peaks within an input data waveform are detected during time intervals at which the derivative of the data waveform has a value of zero and the amplitude of the data waveform exceeds a predetermined threshold value. PPM data recording was widely utilized in the previous generation of optical data storage media, including both single-speed (1×) and double-speed (2×) optical disks. PWM data recording is a data encoding method in which the presence of a signal transition in a bit cell time interval indicates a selected one of a binary 1 or a binary 0, and the absence of a signal transition in a bit cell time interval indicates the other of the two possible binary states. PWM data recording is utilized in the current generation of optical data storage media, including 4× optical disks and Digital Video Disk ROM and Digital Video Disk RAM.

Figure 2:
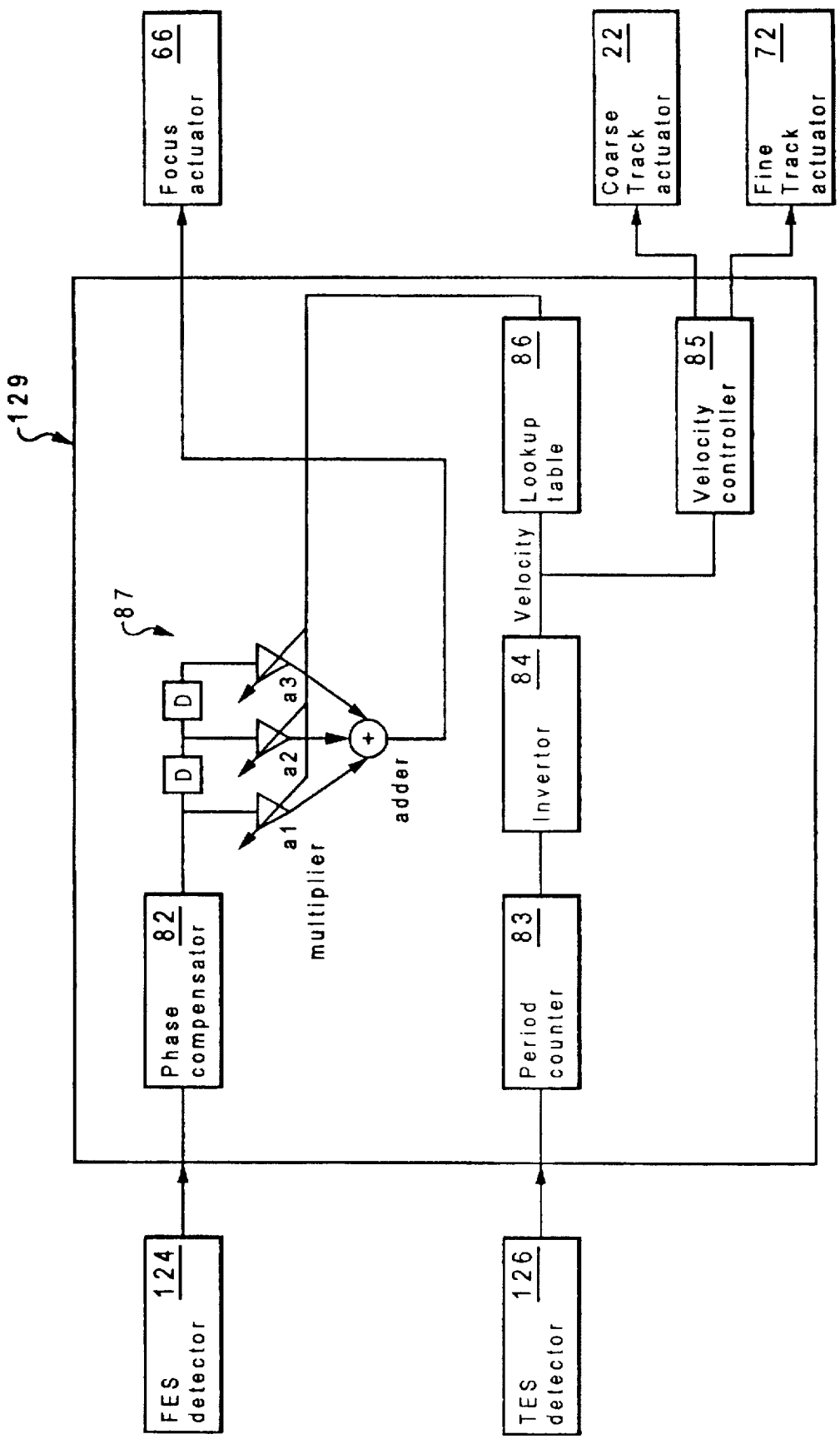
FIG. 2 is a functional block diagram of the key components for cancelling optical servo crosstalk, according to a preferred embodiment of the invention.

With reference now to FIG. 2, there is illustrated a functional block diagram of the key components for cancelling optical servo crosstalk in accordance with a preferred embodiment of the invention. Block 129 receives input signals from FES detector circuit 124 and TES detector circuit 126 while sending output signals to focus actuator 66, coarse track actuator 22 and fine track actuator 72, correspondingly. As shown, block 129 is comprised of a phase compensator 82, a period counter 83, an invertor 84, a velocity controller 85, a lookup table 86 and a notch filter 87. All the components from focus servo 128 and track & seek servo 130 that are relevant to the present invention are included in block 129. In addition, notch filter 87 is strategically located among the components within block 129 for minimizing the response of the focus servo loop to the deleterious false FES.

As shown, notch filter 87 is located after phase compensator 82, though notch filter 87 may be located before phase compensator 82. In a preferred embodiment of the invention, notch filter 87 is a three-tap variable-frequency digital filter with tap coefficients $a_1$, $a_2$, and $a_3$. An appropriate set of tap coefficients $a_1$, $a_2$ and $a_3$ may be supplied by lookup table 86 to notch filter 87 for filtering the false FES, in response to the head velocity of moving optical element 20. In essence, when the head velocity is high such that the FES servo loop cannot respond to the false FES, a set of bypass tap coefficients is chosen to pass all frequencies. On the other hand, when the head velocity is low, various sets of tap coefficients are correspondingly selected to efficiently filter out the frequency components of the false FES according to the head velocity of moving optical element 20 at the time.

A time domain equation for notch filter 87 may be represented by $$y(n)=a_1x(n)+a_2x(n-1)+a_3x(n-2)$$

where $a_1$, $a_2$, and $a_3$ are tap coefficients for the notch filter. As a preferred embodiment of the invention, five sets of tap coefficients may be utilized in notch filter 87 for tracking the entire head velocity profile during a seek operation. These five sets of tap coefficients are stored in lookup table 86.

Referring now to Table I, there is depicted the five different sets of tap coefficients for notch filter 87 in accordance with a preferred embodiment of the invention. Tap coefficients set A, having a lower notch frequency, is applicable during the initial and the final stages of the seek operation when the head velocity is relatively low. As the head velocity increases, tap coefficients having a higher notch frequency, such as set B through set D, are more appropriate to filter out the higher frequency false FES generated by the higher head velocity. When the head velocity is at its peak, there is not too much concern about the effect of the false FES anymore, and thus, tap coefficients set E having an all-pass frequency would suffice.

TABLE I

| set | notch frequency | $a_1$ | $a_2$ | $a_3$ |
|-----|-----------------|-------|-------|-------|
| A | $F_s/6$ | 1 | −1 | 1 |
| B | $F_s/4$ | ½ | 0 | ½ |
| C | $F_s/3$ | ⅓ | ⅓ | ⅓ |
| D | $F_s/2$ | ½ | ½ | 0 |
| E | Bypass | 1 | 0 | 0 |

$F_s$ = sampling frequency

The head velocity of the moving optical element can be obtained from the track & seek servo components of block 129 in FIG. 2. As shown, the period of tracking error signal (TES period) is first obtained via a period counter 83 that counts the time interval of the TES cycle from TES detector 123. The obtained TES period is then utilized to calculate the head velocity of the moving optical element. The head velocity is calculated by taking the inverse of the TES period with inverter 84. The calculated head velocity is subsequently utilized in conjunction with lookup table 86 to determine an appropriate set of tap coefficients, $a_1$, $a_2$, and $a_3$ for notch filter 87. This calculated head velocity is also utilized by velocity controller 85 to control coarse track actuator 22 and fine track actuator 72.

Figure 3A:
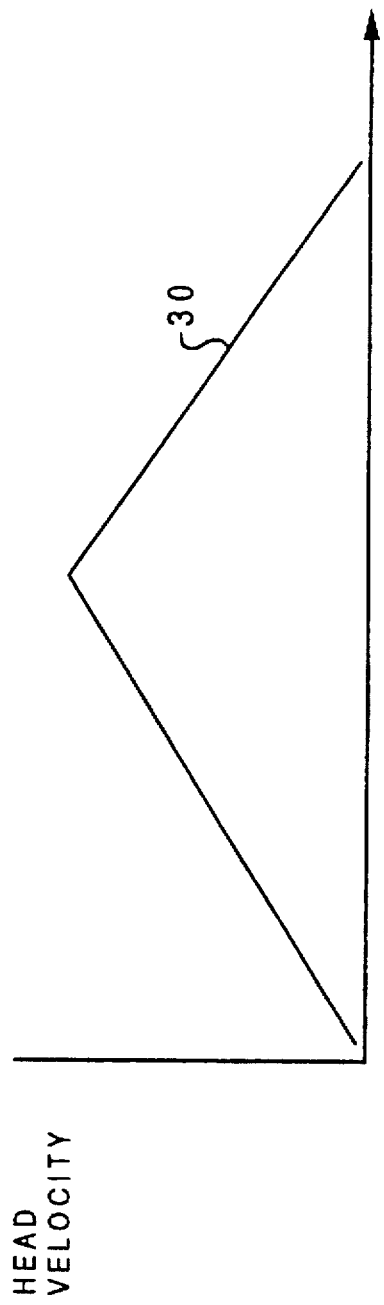
FIG. 3a, 3b graphically illustrates the relationships between the head velocity during a seek operation and the various notch frequencies provided by the notch filter of FIG. 2, in accordance with a preferred embodiment of the invention.
Figure 3B:
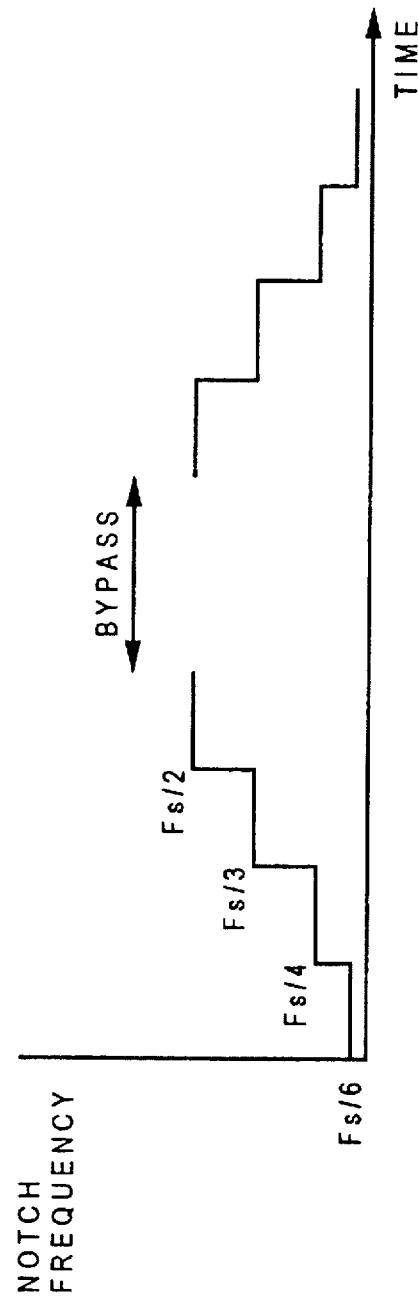

Referring now to FIGS. 3a and 3b, there are illustrated graphically the relationships between the head velocity of the moving optical element during a seek operation and the various notch frequencies provided by notch filter 87, in accordance with a preferred embodiment of the invention. Curve 30 indicates that, during a seek operation, the head velocity increases from zero velocity to a peak velocity in a linear fashion and then decrease from the peak velocity back to zero velocity also in a linear fashion. As mentioned previously, during the initial and final stages of the seek operation when the head velocity is relatively low, a low notch frequency, $F_s/6$, is chosen for filtering the false FES. As the head velocity increases, a higher notch frequency is correspondingly selected from $F_s/4$ to $F_s/2$ in order to track the high frequency false FES. Finally, when the head velocity is at its peak, because there is not much concerned about the effect of the false FES and thus, only a bypass notch frequency is utilized.

The following example illustrates how the various sets of tap coefficients in Table I are utilized to control a variable-frequency notch filter 87. This example assumes that a digital signal processor (DSP) controls the various servo functions as well as the variable-frequency notch filter via software. Further, the sampling frequency, $F_s$, is set to 64 KHz. When the head velocity of the moving optical element is approximately 10 KHz, the DSP selects tap coefficients set A of Table I that are stored within lookup table 86. The notch frequency of the resulting notch filter according to the second column of Table I is about 10.7 KHz. When the head velocity of the moving optical element increases to approximately 15 KHz, the DSP selects tap coefficients set B which provides a notch frequency of 16 KHz. When the head velocity of the moving optical element increases to approximately 22 KHz, the DSP selects tap coefficients set C which provides a notch frequency of 21.3 KHz. When the head velocity of the moving optical element increases to approximately 33 KHz, the DSP selects tap coefficients set D which provides a notch frequency of 32 KHz. Finally, when the head velocity of the moving optical element reaches its peak of approximately 45 KHz, the DSP selects tap coefficients set E which passes all frequencies. After the peak velocity has been reached and as the head velocity of the moving optical element is decreasing, each set of tap coefficients will be supplied to the variable-frequency notch filter in a reverse order of what has just been described.

Figure 4A:
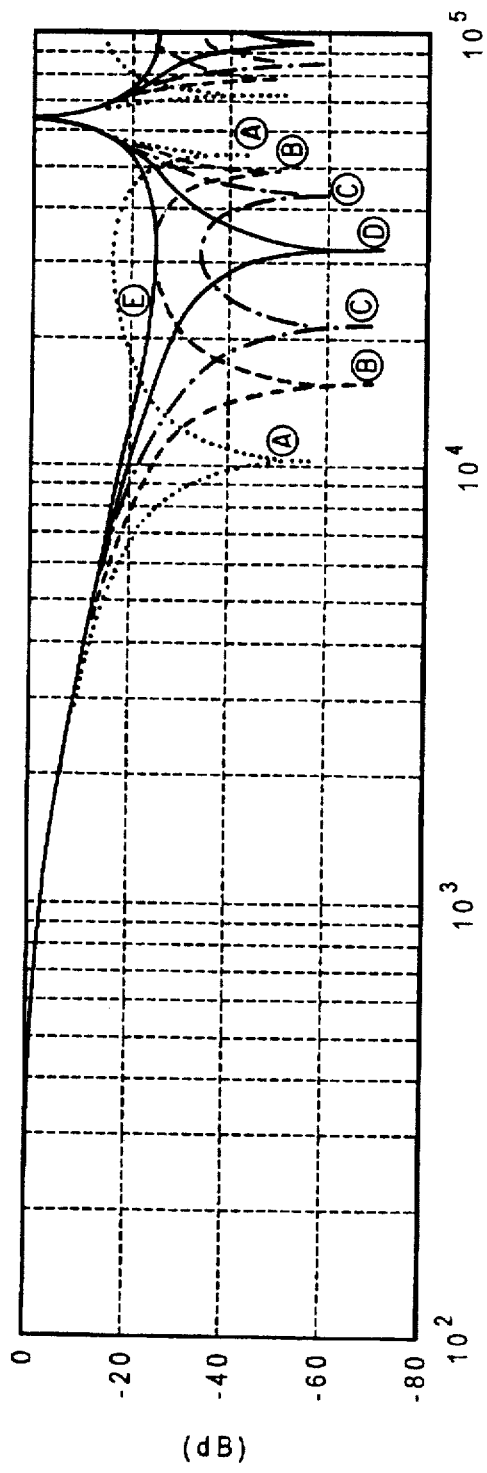
FIG. 4a, 4b show the open loop transfer functions of the focus servo system when various sets of tap coefficients is being applied to the notch filter of FIG. 2, in accordance with a preferred embodiment of the invention.
Figure 4B:
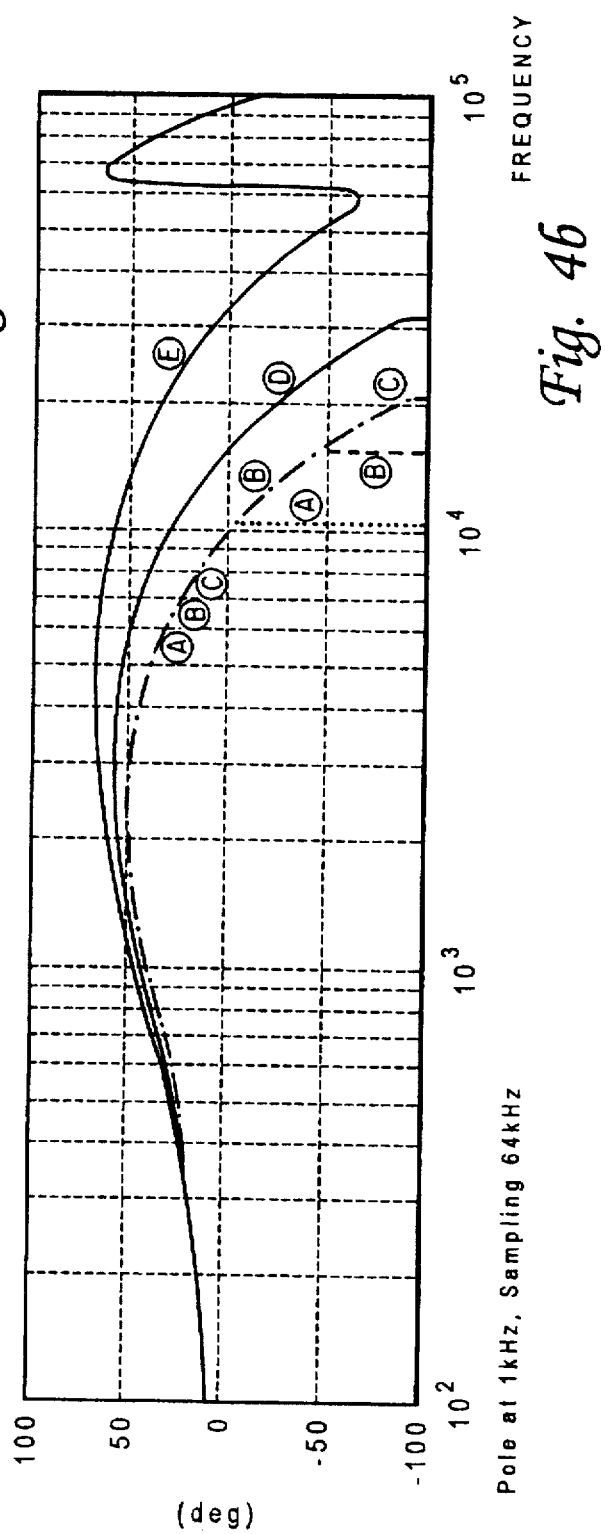

With reference now to FIGS. 4a and 4b, there are shown the open loop transfer functions of the focus servo system when each set of tap coefficients in Table I is being applied to the notch filer of FIG. 2, in accordance with a preferred embodiment of the invention. Each set of tap coefficients in Table I is labelled adjacently each curve accordingly. There are some loss of gain and phase margin in each of the filter set implementation; however, this should not be a major concern because the notch filter only operates for a very short period of time such that the overall adverse effect should be very minor.

As has been described, the present invention provides an improved method and system for cancelling optical servo crosstalk within an optical disk drive. The present invention resolves the optical servo crosstalk problem that is typically associated with the astigmatic method of focus error detection and push-pull method of tracking error detection system without resorting to any extra expensive optical devices. Thus, the present invention provides a very inexpensive solution. Further, if the focus servo and the track & seek servo are implemented with a digital signal processor, then no additional hardware will be required under the present implementation as disclosed. In addition, as a software implementation, the three-tap FIR (finite impulse response) filter and the manipulation of the tap coefficients does not require a large computational overhead. This is because, as shown previously in FIGS. 3a and 3b the notch frequency is required to change only a few times during the entire seek operation. When the control mode of the optical disk drive changes from a seeking to a track-following, the variable-frequency notch filter can be easily disabled by changing the tap coefficients again. In addition, the performance of the focus servo is not degraded by the variable-frequency filter because the servo loop bandwidth does not have to be reduced to accommodate for the changes required by the invention.

While the invention has been particularly shown and described with reference to a preferred embodiment, it will be understood by those skilled in the art that various changes in form and detail may be made therein without departing from the spirit and scope of the invention.

What is claimed is:

1. An optical disk drive system having a false focus error signal (FES) cancellation mechanism, said optical disk drive system comprising:

a focus control means for moving an objective lens in response to an FES to maintain a laser beam in an in-focus condition on an optical disk;

a tracking control means for moving a moving optical element in response to a tracking error signal to direct said laser beam onto a desired track position of said optical disk;

a variable-frequency notch filter within said focus control means;

a lookup table within said focus control means for storing a plurality of sets of tap coefficients for said variable-frequency notch filter, wherein an appropriate set of tap coefficients from said lookup table is supplied to said variable-frequency notch filter in response to a head velocity signal from said tracking control means such that the effects caused by a false FES in said optical disk drive system are reduced.

2. The optical disk drive system according to claim 1, wherein said variable-frequency notch filter is a three-tap finite impulse response filter.

3. The optical disk drive system according to claim 1, wherein said variable-frequency notch filter includes notch frequencies of $F_s/6$, $F_s/4$, $F_s/3$, $F_s/2$, and all-pass, wherein $F_s$ is a sampling frequency.

4. The optical disk drive system according to claim 1, wherein said notch filter's notch frequency is directly proportional to said head velocity signal from said tracking control means.

5. The optical disk drive system according to claim 1, wherein said focus control means, said tracking control means, said variable-frequency notch filter, and said lookup table are implemented within a digital signal processor.

6. A method for cancelling optical servo crosstalk during a seek operation within an optical disk drive system, said method comprising the steps of:

tracking a head velocity of a moving optical element utilizing a tracking control means;

storing plurality sets of filter coefficients in a lookup table;

supplying an appropriate set of filter coefficients from said lookup table to a notch filter within a focus control means in response to said head velocity of said moving optical element;

filtering optical servo crosstalk utilizing said notch filter such that the effects of optical servo crosstalk in said optical disk drive system are reduced.

7. The method for cancelling optical servo crosstalk within an optical disk drive system according to claim 6, wherein said step of storing plurality sets of filter coefficients further includes a step of storing plurality sets of filter coefficients which provide notch frequencies of $F_s/6$, $F_s/4$, $F_s/3$, $F_s/2$, and all-pass, wherein $F_s$ is a sampling frequency.

8. The method for cancelling optical servo crosstalk within an optical disk drive system according to claim 6, wherein said step of supplying filter coefficients to a notch filter further includes the step of supplying filter coefficients to a variable-frequency notch filter.

9. The method for cancelling optical servo crosstalk within an optical disk drive system according to claim 6, wherein said supplying step further includes the step of supplying a set of filter coefficients to yield a notch frequency that is directly proportional to a head velocity signal from said tracking control means.

10. The method for cancelling optical servo crosstalk within an optical disk drive system according to claim 6, wherein said tracking step, said storing step, said supplying step, and said filtering step are performed by a digital signal processor.

* * * * *